United States Patent
Cook et al.

(10) Patent No.: US 6,432,855 B1
(45) Date of Patent: Aug. 13, 2002

(54) SUPERABRASIVE BORIDE AND A METHOD OF PREPARING THE SAME BY MECHANICAL ALLOYING AND HOT PRESSING

(75) Inventors: Bruce A. Cook, Ankeny; Joel L. Harringa; Alan M. Russell, both of Ames, all of IA (US)

(73) Assignee: Iowa State University Reseach Foundation, Inc,., Ames, IA (US)

( * ) Notice: Subject to any disclaimer, the term of this patent is extended or adjusted under 35 U.S.C. 154(b) by 0 days.

(21) Appl. No.: 09/576,674

(22) Filed: May 23, 2000

Related U.S. Application Data

(62) Division of application No. 09/327,052, filed on Jun. 7, 1999, now Pat. No. 6,099,605.

(51) Int. Cl.[7] .............................................. C04B 35/58
(52) U.S. Cl. .................... 501/96.3; 501/96.4; 501/98.4; 501/97.1; 501/97.2; 501/97.3; 501/98.5; 264/299; 264/319
(58) Field of Search ................... 51/307, 293; 501/96.3, 501/96.4, 98.4, 97.1, 97.2, 97.3, 98.5; 264/299, 319

(56) References Cited

U.S. PATENT DOCUMENTS

| | | |
|---|---|---|
| 3,873,329 A | 3/1975 | Beall |
| 3,899,340 A | 8/1975 | Malmendier |
| 3,917,488 A | 11/1975 | Malmendier |
| 3,940,276 A | 2/1976 | Wilson |
| 4,033,901 A | 7/1977 | Buinicky et al. |
| 4,038,290 A | 7/1977 | Gipson |
| 4,045,234 A | 8/1977 | Ring |
| 4,605,634 A | 8/1986 | DeAngelis |

*Primary Examiner*—Michael Marcheschi
(74) *Attorney, Agent, or Firm*—McKee Voorhees & Sease, P.L.C.

(57) ABSTRACT

A ceramic material which is an orthorhombic boride of the general formula: $AlMgB_{14}{:}X$, with X being a doping agent. The ceramic is a superabrasive, and in most instances provides a hardness of 40 GPa or greater.

5 Claims, No Drawings

SUPERABRASIVE BORIDE AND A METHOD OF PREPARING THE SAME BY MECHANICAL ALLOYING AND HOT PRESSING

CROSS REFERENCE TO A RELATED APPLICATION

This application is a division of Ser. No. 09/327,052 filed Jun. 7, 1999 U.S. Pat. No. 6,099,605.

GRANT REFERENCE

This research was federally funded under DOE contract number W-7405-ENG-82. The Government may have certain rights in the invention.

FIELD OF THE INVENTION

This invention relates to a new and unique ceramic superabrasive material.

BACKGROUND OF THE INVENTION

Hardness is a fundamental material parameter that measures the resistance of a material to an applied compressive load. It is a function of both the strength of the interatomic bonding and of the rigidity (or compliance) of the lattice framework. Diamond is the hardest known bulk material (approximately 70 GPa "giga pascals"), due to strong covalent $sp^3$ bonding in a tetrahedral lattice configuration, and its hardness would make it an excellent material for grinding ferrous-based materials such as engine blocks and other automotive components. However, it is expensive and reacts with iron (graphitization) leading to rapid wear when applied against ferrous and high nickel-content alloys. Cubic boron nitride, β-BN, is a material with the diamond crystal structure in which the carbon atoms of diamond are replaced by boron and nitrogen. The resulting material exhibits much lower chemical reactivity with iron, but also possesses a significantly lower hardness than diamond, approximately 45 GPa. The cubic polymorph of BN can be prepared only by a combination of high temperatures (1800 to 2000° C.) and extremely high pressures (65 kbar=50,000 atmospheres). As a result, the cost of β-BN can exceed $7,000 per pound ($15,000 per kg). Consequently, β-BN is prohibitively expensive for all but the most high value, specialized applications. For example, grinding and finishing operations for automotive hardened steel stamping dies are constrained to the use of β-BN for milling applications due to lack of a suitable cost-effective alternative. The next hardest abrasive bulk materials are silicon carbide and vanadium carbide, each with a hardness within the 24 to 28 GPa range. The lower hardness of these materials renders them inappropriate for the demands of high volume, industrial grinding and finishing operations. Therefore, development of a cost-effective abrasive material with a hardness comparable to that of β-BN would be a significant benefit to industry for which there is a real need.

A recent study of complex ternary borides revealed a new class of lightweight, ultra-hard ceramics. These alloys, aluminum magnesium boride alloyed with a few atomic percent group IV or group V element ($AlMgB_{14}$:X where X=Si, P, C), were prepared by mechanical alloying, a high energy solid state technique, and consolidated by vacuum hot pressing. The $AlMgB_{14}$ intermetallic compound is based on four $B_{12}$ icosahedral units positioned within an orthorhombic unit cell containing 64 atoms. The icosahedra are positioned at (0,0,0), (0,1/2,1/2), (1/2,0,0), and (1/2,1/2,1/2) while the Al atoms occupy a four-fold position at (1/4,3/4,1/4) and the Mg atoms occupy a four-fold position at (0.25,0.359,0). The unique electronic, optical, and mechanical properties of this material are due to a complex interaction within each icosahedron (intrahedral bonding) combined with interaction between the icosahedra (intericosahedral bonding). The hexagonal icosahedra are arranged in distorted, close-packed layers. Table I provides a comparison with several hard materials along with their corresponding density, bulk, and shear moduli.

TABLE I

Density, Hardness, Bulk and Shear Moduli of Selected Hard Materials

| | Density (g/cm³) | Hardness (GPa) | Bulk Modulus (GPa) | Shear Modulus (GPa) |
|---|---|---|---|---|
| C(diamond) | 3.52 | 70–90 | 443 | 535 |
| BN(cubic) | 3.48 | 50–60 | 400 | 409 |
| $C_3N_4$ (cubic) | † | † | 496 | 332 |
| SiC | 3.22 | 24–28 | 226 | 196 |
| $Al_2O_3$ | 3.98 | 21–22 | 246 | 162 |
| $TiB_2$ | 4.50 | 30–33 | 244 | 263 |
| WC | 15.72 | 23–30 | 421 | — |
| AlN | 3.26 | 12 | 203 | 128 |
| TiC | 4.93 | 28–29 | 241 | 188 |
| $AlB_{12}$ | 2.58 | 26 | | |
| $Si_3N_4$ | 3.19 | 17–21 | 249 | 123 |
| $AlMgB_{14}$ | 2.66 | 35–40 | * | * |

\* unknown, or not well characterized
† presently available in quantities too small to permit measurement of density and hardness Prior work on these complex orthorhombic borides has mainly involved determination of crystal structure. I. A. Bairamashvili, L. I. Kekelidze, O. A. Golikova, and V. M. Orlov *J. Less Comm. Met.* 67 (1979) 461 initially examined the thermoelectric properties of this and related borides prepared by hot pressing powders produced from crystallization of aluminum melt solutions. They observed that these compounds exhibited high melting points and were relatively brittle. W. Higashi and T. Ito *J. Less Comm. Met.* 92(1983)239 conducted an extensive crystallographic study on the 1:1:14 compound and established the lattice parameters and atom positions but performed no property measurements. More recently, H. Werheit, U. Kuhlmann, G. Krach, I. Higashi, T. Lundstrom, and Y. Yu *J. Alloys and Compounds* 202(1993)269 examined the optical and electronic properties of the orthorhombic $AlMgB_4$ prepared by growing single crystals in alumina crucibles from Al-B solutions containing Li or Mg. In addition to their unique mechanical properties, evidence suggests that these systems exhibit novel electronic properties such as hopping conduction. Crystallographic studies indicate that the metal sites are not fully occupied in the lattice so that the true chemical formula may be closer to $Al_{0.75}Mg_{0.78}B_{14}$, which is contemplated by the formula here used as $AlMgB_{14}$.

The primary objective of this invention is to provide a new, lightweight, extremely hard ceramic by intentionally modifying the composition of the baseline alloy.

SUMMARY OF THE INVENTION

A ceramic material which is an orthorhombic boride of the general formula: $AlMgB_{14}$:X, with X being a doping agent. The ceramic is a superabrasive, and in most instances provides a hardness of 40 GPa or greater.

DETAILED DESCRIPTION OF THE INVENTION

The ceramic, as hereinbefore explained, is an orthorhombic boride of the general formula: $AlMgB_{14}$:X. In the formula X represents from about 5 atomic or weight percent to about 30 atomic or weight percent of a doping agent which dramatically increases the hardness of the baseline boride ceramic. If a single element addition, it is atomic percent; if a compound, it is weight percent. In particular, it can, and often does increase the hardness by as much as 10–20%, depending upon the particular doping agent used. Preferred doping agents are elements from group III, IV and V of the periodic chart, and borides and nitrides derived from those such as $TiB_2$, AlN, and BN. The most dramatic results have been observed when $TiB_2$ is the doping agent. Preferred amounts are 10% to 20%, based on atomic/weight percents. It is not known why a dramatic increase in hardness occurs, and while applicant does not wish to be bound by any theory, one possibility might be that the Si atoms substitute for Al in the orthorhombic unit cell. If the interstitial sites corresponding to the Al atoms were smaller than the Mg sites, it is conceivable that the slightly smaller Si atoms might give rise to a higher occupancy than the 74.8% reported by Higashi and Ito. Consequently, the overall intericosahedral bonding might be stronger, leading to a more rigid unit cell. Moreover, the additional electron provided by the Si would be available for forming an additional bond with the boron icosahedra.

The invention also relates to a process of preparing this new superabrasive ceramic material. The process can generally be described as mechanical alloying, coupled with hot pressing. In a typical operation, the baseline alloy and consolidation of its powder into the dense compact are prepared in the following manner. Mechanical alloying (MA) was selected as the initial route to alloy formation because of its ability to generate fine, sinterable powders. As the particle size is reduced, diffusion distances become smaller, thereby enhancing sintering. An additional benefit of mechanical alloying is the high surface-to-volume ratio which promotes chemical reactivity and alloy formation. The large number of independent variables complicate identification of an optimum processing route. These variables include milling type (vibratory vs. planetary vs. attritor), vial geometry (convex curvature vs. flat-ended), ball-to-charge weight ratio, milling atmosphere, milling time, and type of precursor material (powders vs. chunks). Thirty combinations of these parameters were examined in order to obtain the optimum processing method. Briefly, the approach developed during this study involves weighing out stoichiometric amounts of boron, in the form of millimeter-sized pieces, and milling for 15 minutes in a hardened steel vial along with three 8 mm dia. and three 2 mm dia. hardened steel balls in a Spex 8000 vibratory mill. This 'premilling' step was found to be essential for comminuting the boron into a fine powder prior to mixing with the other components. Millimeter-sized pieces of Mg were then added to the vial along with −325 mesh Al powder and the milling was continued for a total of 12 hours. All processing was performed under a purified helium atmosphere. At the end of the 12 hour milling period, the product was a black powder. An X-ray study of the powder at various stages of processing in round-ended vials was conducted in order to determine whether alloy formation occurs during MA, or whether MA simply reduces particle size (i.e., diffusion distances) which, in turn, facilitates alloy formation during hot pressing. The X-ray patterns were obtained on a small quantity of powder removed from the vials in a helium-filled glove bag at regular intervals. A Scintag powder diffractometer configured for Cu K-alpha radiation was employed to obtain the results. Considerable line broadening was observed during MA, indicating the presence of strain (cold work) in the Al and Mg and particle size refinement. Analysis of the pattern after 20 hours of processing indicated that the material was nanocrystalline, with the presence of a few low intensity peaks corresponding to the individual components. Preliminary examination of the pattern indicates that no significant amount of alloying occurs during milling, although a small amount of $FeB_{49}$ was observed, presumably due to interaction with wear debris from the high energy milling process.

Generally speaking, the amounts of boron, magnesium and aluminum used are stoichiometric amounts. The time for individual milling of the boron should be from 10 min. to 20 min. The total milling time when all are mixed together should be from 8 hours to 15 hours. It is preferred that this milling occur under an inert gas atmosphere, and helium is satisfactory, although not required. As a general matter, particle sizes should be U.S. mesh −150 to −400. After the milling, next is hot pressing.

Consolidation of the loose powder was accomplished by hot pressing in BN-lined graphite dies under $10^{-7}$ torr vacuum level. Various temperatures within the range of 1300° C. to 1500° C. were evaluated in order to determine the optimum for consolidation. It was found that sublimation of a metallic coating on the hot press components occurred at temperatures greater than 1400° C. Analysis of this material by EDS in a Cambridge-200 SEM indicated that the film was magnesium. Consolidation temperatures below 1300° C. resulted in porous, low-density compacts. Subsequent samples were pressed within a 1350 to 1400° C. temperature range. After cooling and removal of the die from the hot press, the consolidated samples were ejected and the BN protective coating was abraded off. A total of 27 hot pressings were performed. Apparent density of the bulk compacts was determined using an Archimedes immersion technique, and most of the samples pressed at 1400° C. had a density of 98% of theoretical density (2.6 g/cm$^3$).

Due to the extreme hardness of these materials, it is difficult to polish the hot-pressed compacts to produce a sufficiently smooth surface upon which reliable microhardness measurements could be obtained. Mechanical abrasion with SiC sandpaper had little effect, even after relatively long times (hours) at coarse grit (#240). Special diamond polishing wheels were employed and gave moderately good results, although microscopic examination of the polished surfaces showed relatively few smooth areas of at least 30 microns or larger in maximum linear dimension. In order to obtain accurate hardness values, the indentation should be as far away from defects as possible. Vickers indentation tests performed on many of the initial baseline compacts gave unreliable values with a considerable amount of scatter. The difficulty in polishing these materials results in formation of microscopic surface asperities which interfere with the measurement. Within these few smooth regions, hardness values of 33 to 35 GPa were typically observed. However, in regions of observable porosity, the apparent hardness was lower, ranging from 25 to 30 GPa. The surface smoothness was improved by lengthening the grinding and polishing times at each grit. This appears to give good quality surfaces, resulting in reproducible hardness values on the undoped "baseline" materials near 35 GPa.

The following examples offer the test results for the ceramics of the present invention and are presented as illustrative and not intended to be limiting in scope.

Because one of the key industrial concerns for an abrasive material is its chemical activity with the workpiece, this was tested. Several sets of diffusion "couples" of the boride were prepared with 304L stainless steel, pure iron, and titanium in order to examine the effects of time, temperature, and applied pressure on reactivity. These specific metals were chosen because of their industrial significance. Two configurations were examined; one in which a piece of fully dense $AlMgB_{14}$ was sandwiched between nominally 1 mm thick iron and Ti disks, the other in which the boride was positioned directly below a 6.35 mm dia. steel rod segment. The boride surfaces were prepared by grinding against a series of progressively finer diamond polishing wheels and rinsed with hexane between steps. The iron and titanium surfaces were also polished and rinsed with hexane prior to assembly of the sandwich. The components were positioned inside a graphite die which was in turn positioned in a high temperature graphite furnace. The tests were all conducted under medium vacuum conditions ($10^{-6}$ T) and a light load was applied to the die (~1–2 MPa) in order to hold the components in intimate contact. The temperature of the furnace was ramped at 10° C./min. to soak point of 1000° C. to 1300° C. and held for two hours. One of the diffusion couples, prepared at a temperature of 1200° C. for 2 hours, was sectioned with a high speed diamond saw, mounted in diallylphthalate resin along with Al and Mg standards, and polished to 0.25 micron. In no case was there any indication of a reaction between the boride and titanium.

A series of qualitative "pull off" tests were also conducted between pieces of the boride material and 6.35 mm diameter segments of 304L stainless steel rod. A similar configuration of temperature and pressure were employed with the objective being to provide an indication of the point at which significant reactivity between the components occurred. The couples were subjected to temperatures ranging from 1000° C. to 1300° C. for one hour. The only evidence of a reaction in these tests was provided by the 1300° C. specimen, in which a slight amount of force was necessary to separate the pieces. Some darkening of the specimen and iron occurred during the thermal treatment, which is thought to be related to graphitization from the furnace components.

In addition to the stoichiometric materials discussed above, several alloys were prepared with additions of both elemental silicon, previously found to increase hardness, and with compounds such as $TiB_2$, AlN, and BN. Samples were prepared in the same manner as the stoichiometric "baseline" materials except that 5 at. % Si was added to the initial powder charge. Microhardness values of the Si-doped samples were consistently higher than those of the baseline material by 10–20%, typically falling between 34 and 38 GPa. The reason for the increased hardness accompanying silicon addition is uncertain at the present time.

A dramatic improvement in hardness was found to result from addition of $TiB_2$. A baseline sample was weighed out and milled as described above, and 30 wt. % $TiB_2$ was added in the form of –200 mesh powder following the normal milling sequence. The mixture was milled an additional 30 minutes, and the powder was hot pressed at 1300° C. for one hour. The microhardness of the compact was found to range from 38 GPa to 46 GPa, depending on position of the indenter. A two-phase microstructure was clearly evident, with a high density of second phase distributed uniformly throughout the material.

This example has demonstrated that single phase bulk specimens of $AlMgB_{14}$ can be reproducibly prepared by mechanical alloying and hot pressing. Increases in hardness relative to the baseline alloy were found to result form additions of Si and $TiB_2$. $AlMgB_{14}$:X clearly provides an exciting and promising alternative to cubic boron nitride for industrial grinding and finishing operations. One of the most exciting potential applications for $AlMgB_{14}$:X is as a wear resistant coating material. Since neither diamond nor CBN can be plasma-sprayed, it is possible that $AlMgB_{14}$:X may be the hardest material that can be plasma-sprayed. Thermally-sprayed coatings find extensive applications to reduce machinery wear and corrosion. Examples of coating materials include metals such as Mo-based alloys, aluminum bronze, stainless steels, cermets such as WC—Co, $Cr_3C_2$/NiCr and ceramics such as $Al_2O_3$—$TiO_2$ and $Cr_2O_3$. Mo-based coatings are used in automotive piston rings to provide scar resistance and reduce adhesive sliding wear. WC—Co and $Cr_3C_2$/NiCr based cermets are used extensively as thermal spray coatings for protection against abrasive wear environments. The single largest user of such coatings is the aircraft engine industry where the turbine compressors, mid-span stiffeners and other components are coated to reduce wear and increase component life. Carbide coatings have been applied to aircraft engine components since the early 1950s. These coatings have also been applied in numerous industrial assemblies such as printing rolls, petrochemical equipment, and steel plant machinery. Recent developments in the use of thermal spray coatings for wear resistance include coatings on Al-alloy cylinders for internal combustion engines. Preliminary results have been encouraging and are fueling increased interest and support for use of Al-alloy components. Automotive companies currently plasma spray alumina onto millions of alternators each year. Insulated metal substrates are formed with plasma spraying for use in the microelectronics industry. And diesel engine manufacturers, in producing fuel-efficient low-heat rejection engines, are using plasma spraying to form thick thermal barrier coatings on piston crowns.

From the above it can be seen that the invention accomplishes its objectives to provide an efficient, cost-effective superabrasive material with extreme hardness with widespread industrial applicability.

What is claimed is:

1. A process of preparing a ceramic material, comprising:

milling approximately stoichiometric amounts of boron, magnesium and aluminum until substantially uniform, and thereafter mixing the milled materials with 5 weight % to 30% weight % of a doping agent selected from the group consisting of Group III, IV, or V elements or borides and nitrides derived therefrom, and thereafter hot pressing the milled mixture at a temperature of from 1300° C. to 1500° C. for a time sufficient to form said ceramic.

2. The method of claim 1 wherein said milling occurs in the presence of an inert gas atmosphere.

3. The method of claim 1 wherein hot pressing occurs at a temperature within the range of 1350° C. to 1400° C.

4. The method of claim 1 wherein hot pressing occurs in a boron nitride-lined graphite die.

5. The method of claim 1 wherein the time sufficient for hot pressing is within the range of from 0.5 hours to 2.0 hours.

* * * * *